United States Patent

[11] 3,568,971

[72] Inventors Howard I. Jarmy
 San Francisco;
 Gary D. Oates, Los Gatos, Calif.
[21] Appl. No. 782,929
[22] Filed Dec. 11, 1968
[45] Patented Mar. 9, 1971
[73] Assignee Singer-General Precision, Inc.
 Binghamton, N.Y.

[54] CATHODE RAY TUBE MOUNTING
 4 Claims, 3 Drawing Figs.
[52] U.S. Cl. ................................................. 248/350,
 248/23, 248/188.4
[51] Int. Cl. .................................................. F16m 11/14
[50] Field of Search .......................................... 248/11, 12,
 13, 23, 16, 188.4, 350

[56] References Cited
 UNITED STATES PATENTS
2,746,313 5/1956 Roubal .......................... 248/23x
2,940,297 6/1960 Mayer ........................... 248/23

FOREIGN PATENTS
375,496 6/1932 Great Britain ................ 248/11
Primary Examiner—Chancellor E. Harris
Attorneys—Francis L. Masselle, William Grobman and Andrew G. Pullos ABSTRACT: In order to mount a cathode ray tube so that the face of the cathode ray tube is parallel to the faces of the optical system through which the image is to be projected and to insure that the axis of the cathode ray tube lies upon the optical axis of the projection system, this cathode ray tube mount utilizes separate base and chassis. The cathode ray tube is rigidly mounted on its own chassis, which may include a complete housing, and the front of the chassis is supported on a ball or universal joint. The back end of the chassis is provided with means for adjusting the vertical and lateral position of each of the two back corners. In the preferred embodiment shown, the adjustment means are manually controlled screws, but any suitable adjustment means can be utilized.

PATENTED MAR 9 1971 3,568,971

INVENTORS
HOWARD I. JARMY
GARY D. OATES
BY
William Grobman

CATHODE RAY TUBE MOUNTING

This invention relates to supporting means and more particularly to means for supporting projection devices such as cathode ray tubes for alignment and adjustment.

One of the more difficult problems in the construction of many systems, particularly those which utilize optical equipment, is the proper alignment of the various elements. Once the elements of such a system are aligned, it is desirable to maintain them in alignment. For this reason the proper alignment is often built into the system. When the alignment is built in, adjustments in the initial positioning are often extremely difficult to make, particularly when the tolerances are small. For example, in mounting cathode ray tubes in image projection systems, the lens systems are often firmly fixed in a rigid tube mounted on the front of the cathode ray tube housing. For proper alignment of the system, it is the cathode ray tube which must be adjusted. In the past this has been done by loosening the cathode ray tube, inserting or removing shim material, and then retightening the tube into position. This is a trial and error method which requires time, patience, and a light touch. Often the inherent lost motion in the system and the minimum thicknesses of the shims used make the overall adjustment only approximate. It is desirable to have a system wherein the adjustable element (the cathode ray tube in the system described) is mounted for ready adjustment after the entire assembly has been made.

It is an object of this invention to provide a new and improved support system.

It is another object of this invention to provide a new and improved adjustable support system.

It is a further object of this invention to provide a new and improved support system for at least one element which must be aligned so that such alignment can be made readily after assembly.

Other objects and advantages of this invention will become more apparent as the following description proceeds, which description should be taken together with the accompanying drawings in which.

Figure 1:
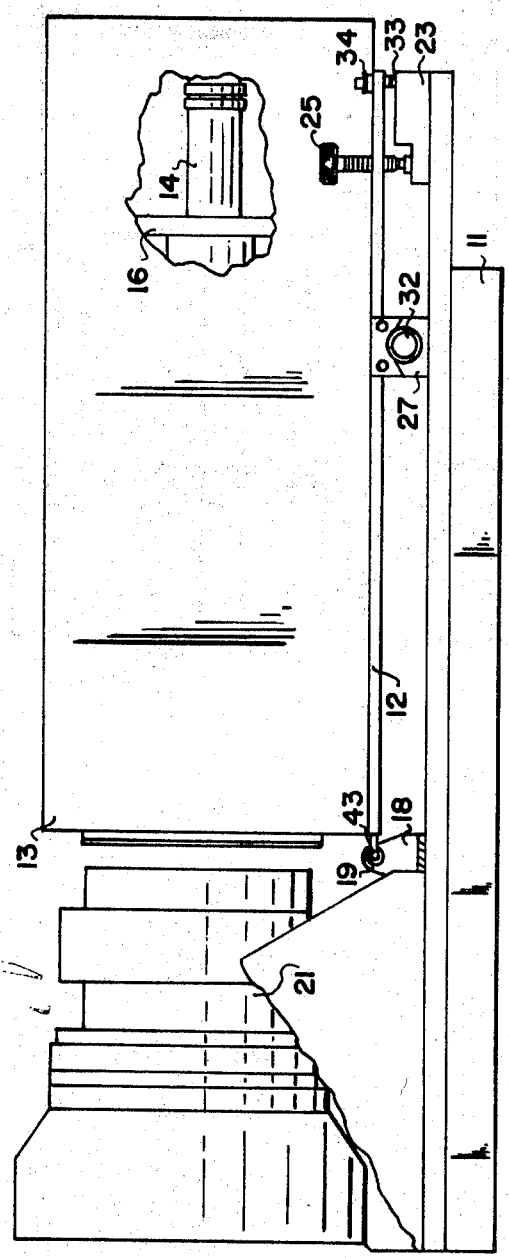
FIG. 1 is a side view, partially in section, of the system in accordance with this invention.
Figure 2:
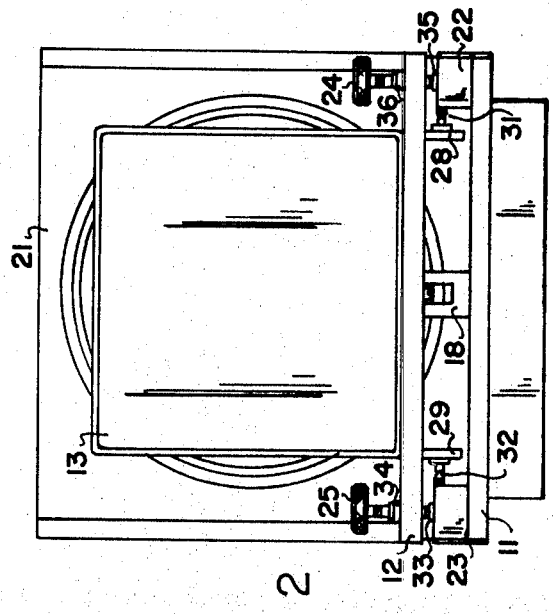
FIG. 2 is a rear view of the system of FIG. 1.
Figure 3:
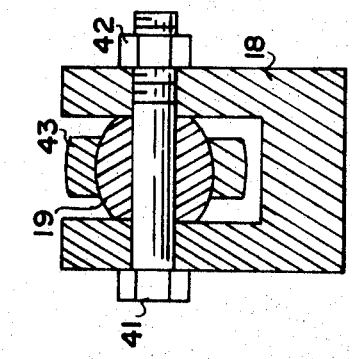
FIG. 3 is a detailed showing of the front support of this system.

Referring to the drawings in detail, the reference character 11 designates a base for the entire system. A separate chassis 12 which can include a cover or housing 13 carries a cathode ray tube 14 which is rigidly supported on the chassis 12, by any suitable means such as a band 16 around the neck of the tube 14. A support member 18 mounted on the base 11 carries a universal joint 19. The chassis 12 is supported at one end by an eye 43 into which a portion of the ball 19 fits. In FIG. 3, the U-shaped support 18 is shown in section and has a bolt 41 passing through holes in its two legs. A nut 42 keeps the bolt 41 in place. On the bolt 41 between the two legs of the support 18 is mounted an eliptical ball 19 which pivotally supports the ring or eye 43 of an eye bolt connected to the front of the chassis 12.

The adjustment means is shown at the rear end of the chassis 12 and the base 11. A pair of vertical posts 22 and 23 are mounted near the rear corners of the base 11. Adjustment screws 24 and 25 are threaded into the chassis 12 and abut the top of the posts 22 and 23 respectively. On each side of the base 11 a vertical member such as 27 is attached. The members 27 are mounted on the outside edges of the base 11, and the chassis 12 fits between them. Corresponding vertical members 28 and 29 are mounted on the outside edges of the chassis 12 in general alignment with the vertical members 27. Adjustment screws 31 and 32 are threaded through the members 27 and abut the vertical members 28 and 29. A lens assembly 21 is external to the housing 13 and represents the projection system with which the cathode ray tube 14 is to be aligned. The lens system 21 may be supported on the base 11 in any suitable manner. In addition, holding screws 33 and 35 are attached at one end to the blocks 22 and 23 and pass through the chassis 12 at the other end. Nuts 34 and 36 are threaded onto the screws 33 and 35.

In operation, as mentioned above, the object of this construction is to readily and simply align the cathode ray tube 14 with the optical system represented by the lens 21. With the chassis 12 positioned as shown on the base 11, it is supported in the front on the ball joint 19 and at the rear by two posts 22 and 23. The ball joint 19 permits movements within limits but with a great amount of freedom. Adjusting the rear vertical screw members 24 and 25 causes the chassis 12 to be tilted so that the cathode ray tube 14 has its longitudinal axis varied with respect to the horizon. Moving or adjusting the lateral screws 31 and 32 will cause the rear end of the chassis 12 to shift laterally and can modify the horizontal position of the longitudinal axis of the cathode ray tube 14. In addition, if the two screws 24 and 25 are adjusted differentially, one rear corner of the chassis 12 can be raised and the other can be lowered causing the chassis 12, in effect, to roll. Thus, the position of the cathode ray tube 14 can be modified along three axes of rotation, a vertical axis, and two horizontal axes. With the structure disclosed herein, the cathode ray tube 14 can be rigidly mounted on the chassis 12 and within the housing 13 during assembly of the overall system. Then, the final adjustments can be made by utilization of the screws 24, 25, 31 and 32 so that the plane of the face of the cathode ray tube 14 and the longitudinal axis of the tube 14 are both properly aligned with respect to the optical system 21. To adjust the position of the cathode ray tube 14, the nuts 34 and 36 on the holding screws 33 and 35 are loosened, then the adjusting screws 24, 25, 31 and 32 are adjusted. The nuts 34 and 36 are then tightened to hold the entire assembly together and in position. The eye 43 can pivot and slide on the ball joint 19 to permit a substantial amount of adjustment, yet the bolt 41 holds the front of the chassis in position.

Although not shown on the drawings to avoid cluttering them, each of the screws 24, 25, 31 and 32 can be readily equipped with a locknut or any other suitable locking device so that once the position of the chassis 12 is determined, the adjusting means is locked firmly into position. Although the drawings show adjustable screws, other adjustment means can also be used. For example, the chassis 12 could rest directly on posts 22 and 23 which, themselves, could be made wedged-shaped. Movement of the wedged-shaped posts 22 and 23 will modify the position of the chassis 12. In addition, where large structures are used, hydraulic systems could readily be used. Thus, a large number of mechanical, hydraulic or electrical equivalents of the adjusting means shown could be substituted therefor.

The above specification has described a new and improved adjustable supporting means for readily and quickly adjusting the position of one object with respect to another. It is realized that a reading of the above description may indicate to others skilled in the art additional ways in which the structure of this invention can be utilized without departing from its spirit. For this reason, it is intended that this invention be limited only by the scope of the appended claims.

We claim:

1. An adjustable support apparatus for aligning equipment after assembly, said apparatus comprising a base, a universal joint mounted on said base, a chassis, means for supporting one end of said chassis on said universal joint, vertical adjustment means mounted on the other end of said chassis, lateral adjustment means mounted adjacent said vertical adjustment means, said vertical adjustment means comprising a vertical support block mounted on either side of said base at one end thereof, an adjusting screw threaded through either side of said chassis so that one end of each of said screws abuts said vertical support block, and at least one locking means for holding said base and said chassis together.

2. An adjustable support apparatus for aligning equipment after assembly, said apparatus comprising a base, a universal joint mounted on said base, a chassis, means for supporting one end of said chassis on said universal joint, vertical adjustment means mounted on the other end of said chassis, lateral adjustment means mounted adjacent said vertical adjustment means, said universal joint comprising a support, a shaft piercing said support, a ball mounted on said shaft, a ring surrounding said ball, means for attaching said ring to said chassis, said vertical adjustment means comprising a vertical support block mounted on either side of said base at one end thereof, an adjusting screw threaded through either side of said chassis so that one end of each of said screws abuts said vertical support block, and at least one locking means for holding said base and said chassis together.

3. An adjustable support apparatus for aligning equipment after assembly, said apparatus comprising a base, a universal joint mounted on said base, a chassis, means for supporting one end of said chassis on said universal joint, vertical adjustment means mounted on the other end of said chassis, lateral adjustment means mounted adjacent said vertical adjustment means, said universal joint comprising a support, a shaft piercing said support, a ball mounted on said shaft, a ring surrounding said ball, means for attaching said ring to said chassis, said lateral adjustment means comprising a vertical side member extending upwardly on each side of said base, and an adjusting screw threaded through each of said side members to bear against the sides of said chassis.

4. The apparatus defined in claim 1 wherein said lateral adjustment means comprises a vertical side member extending upwardly on each side of said base and an adjusting screw threaded through each of said side members to bear against the sides of said chassis.